United States Patent [19]

Wyzenbeek

[11] 4,282,474
[45] Aug. 4, 1981

[54] LIFE-PROLONGING DEVICE FOR HEARING-AID BATTERIES

[75] Inventor: Andrew Wyzenbeek, Chicago, Ill.

[73] Assignee: Laura May Usher, Cincinnati, Ohio

[21] Appl. No.: 95,607

[22] Filed: Nov. 19, 1979

[51] Int. Cl.³ .................... H02J 7/00; H01M 10/46
[52] U.S. Cl. ............................................ 320/2; 320/4; 307/150
[58] Field of Search ................................. 320/2–5; 307/150

[56] References Cited
U.S. PATENT DOCUMENTS

| 3,414,793 | 12/1968 | Jasperson | 320/2 UX |
| 3,947,743 | 3/1976 | Mabuchi et al. | 320/3 X |
| 4,186,335 | 1/1980 | Cahill | 320/3 |

*Primary Examiner*—Robert J. Hickey
*Attorney, Agent, or Firm*—Tilton, Fallon, Lungmus & Chestnut

[57] ABSTRACT

A life-prolonging device for ear level hearing aid batteries and the like in which an electrical circuit mounted on a platform in a box-type housing sends an electric current from a larger battery through a hearing aid battery when an actuating switch lid is in the closed position.

5 Claims, 5 Drawing Figures

LIFE-PROLONGING DEVICE FOR HEARING-AID BATTERIES

BACKGROUND AND SUMMARY OF THE INVENTION

The invention relates to an apparatus for prolonging the life of batteries and, more specifically, to an apparatus and method for reconditioning ear level hearing aid batteries.

Batteries are used in many portable devices today. A very small chemical battery is often used with "in the ear" or "on the ear" type hearing aids. This type of battery generates electricity from the chemical action of an acid or alkali on plates of various metals. This is not to be confused with storage batteries which are only capable of storing electric current charged into them. Successful hearing aid batteries are either the "silver oxide" or "mercury" type. The original chemical battery was a cell comprised of a zinc and a copper plate and immersed in dilute sulfuric acid. One drawback to the use of the chemical battery has been the formation of small bubbles on the zinc element which diminish the flow of current through the cell. Various methods have been devised to delay or remove the polarization of the metallic elements in order that the cell may continue to generate electricity. However, the polarization still plagues all chemical batteries, even though large batteries with large metallic elements are capable of generating a 1.5 volt level for a relatively long time. Unfortunately, the polarization problem is particularly noticeable in very small batteries where the voltage generated drops below the desired 1.5 volt level in a relatively short time. As a result, the small hearing aid batteries have an active lifetime of only five or six days. Their small plates or metallic elements are not exhausted in this short time, but the flow of current is diminished by polarization. These batteries are sold with a warning on the label that they cannot be "recharged" or that they will explode if they are recharged.

For elderly people the cost of repeatedly buying new batteries may become prohibitive. This is particularly true for the individual who is supported by a fixed income. The need to replace the battery in the hearing aid every five or six days also creates problems for users in remote areas of the world, for example, missionaries.

The invention provides a reconditioning device for ear level hearing aid batteries which depolarizes and restores a battery to its original 1.5 volt capacity as long as the metallic elements and the active acid or alkali of the small battery are not exhausted. The device permits a single battery to be reused up to three or four months before a new battery is needed due to loss of chemical action and plate polarization. My life-prolonging device is housed in a box-like container which places the hearing aid battery in parallel with one or more large batteries having a total voltage of exactly 1.5 volts. By this means the hearing aid battery is depolarized and builds up to the same voltage as the larger battery or batteries. Under normal conditions, recharging of the hearing aid battery can take place at night while the user of an ear level hearing aid device is sleeping. Once the hearing aid battery has become completely reconditioned, an equilibrium state is reached wherein no current flows from the larger battery. Thus, no additional energy is wasted. By using my device every night the generating life of the hearing aid battery is prolonged to ten or more times its usual life, depending on the particular miliamperes "draw" of a variety of hearing aids.

When the chemicals or the metallic elements of the hearing aid battery are depleted and the voltage of the battery drops to 1.1 or 1.2 volts, my device will not recharge or restore the worn-out battery. The larger battery eventually will become exhausted too. Therefore, testing apparatus is included in the device to indicate the condition of either battery. Once the lifetime of a battery is completely exhausted, it is simply replaced by another battery.

DESCRIPTION OF THE INVENTION

Figure 1:
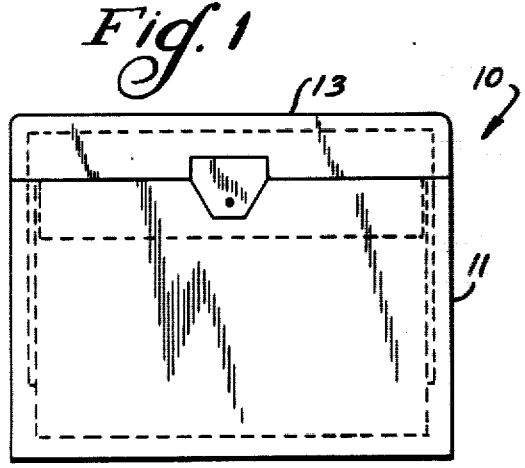
FIG. 1 is a front view of a box-like container which holds the life-prolonging battery apparatus.
Figure 2:
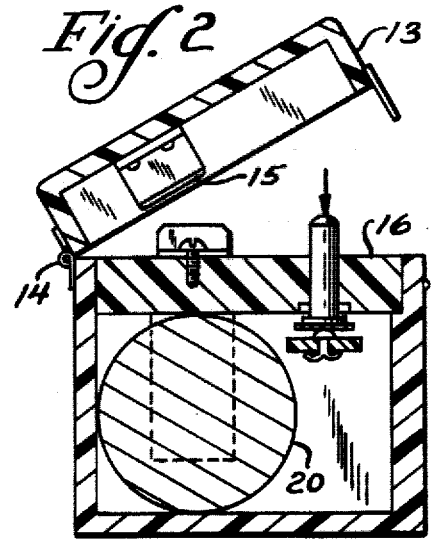
FIG. 2 is a side, cross-sectional view of FIG. 1 with the box lid in the open position.
Figure 3:
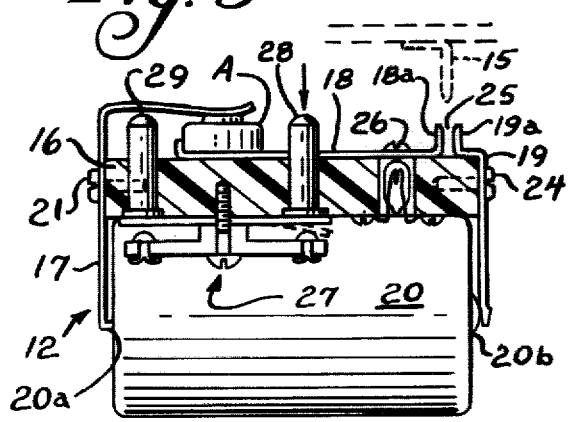
FIG. 3 is the apparatus which fits into the box as shown in FIG. 1.

The numeral 10 in FIG. 1 designates generally the box-type housing of the life-prolonging battery device. The housing includes a lower portion 11 into which the apparatus 12, shown by FIG. 3, is inserted. A lid 13 is pivotally mounted to the lower protion 11 by a hinge 14 as shown in FIG. 2. A metal plate 15 is vertically attached to the interior of the lid 13. The metal plate contacts the apparatus 13, as shown in phantom by FIG. 3, when the lid 13 is in the closed position. Thus, the lid 13 provides a convenient, inexpensive switch.

The apparatus 12 includes a platform 16 constructed of electrical insulating material with three metal strips 17, 18, and 19 affixed thereto. The metal strips combine with metal plate 15 and a large battery 20 to form a circuit (see FIG. 5) for depolarizing a hearing aid battery A by sending current therethrough when the lid is in its closed position.

Referring again to FIG. 3, metal strip 17 is attached to the left side of platform 16 by screw 21. The lower portion of metal strip 17 extends downwardly and is flanged inwardly to make contact with the negative end 20a of large battery 20. The upper portion of metal strip 17 extends upwardly, bends at almost a ninety degree angle with respect to the lowest portion thereof, extends over the platform, and is slightly biased downwardly toward the platform for contact with the negative end of hearing aid battery A.

Figure 4:
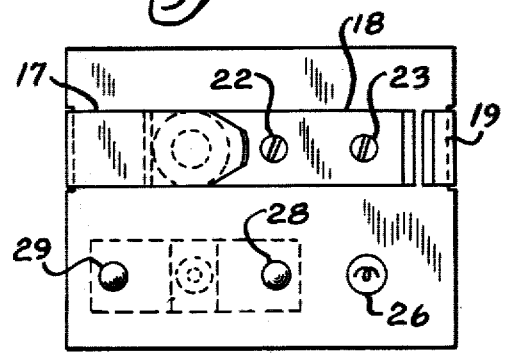
FIG. 4 is a plan view of FIG. 3.

Metal strip 18 is mounted on the top of the platform 16 by screws 22 and 23 (see FIG. 4). The left end of metal strip 18 is flanged upwardly and provides a seat for making contact with the positive end of hearing aid battery A while metal strip 17 maintains contact with the negative end of hearing aid battery A. The right end of metal strip 18 is also flanged upwardly from the platform 16 as at 18a.

Metal strip 19 is attached to the right side of platform 16 by screw 24 and separated by small gap 25 from contacting metal strip 18. The left or upper end of metal strip 19 bends around the upper right hand corner of platform 16 and is flanged upwardly as at 19a to be symmetrical with the right end 18a of metal strip 18. The lower end of metal strip 19 extends downwardly and is slightly biased inwardly to make contact with the positive end 20b of large battery 20. The length of the platform 16 and the contour of the strips 17 and 19 are so related as to bias the strips into electrical contact with the battery ends 20a, 20b. When the box lid 13 is pivoted into the closed position, metal plate 15 enters gap 25 contacting the flanges 18a and 19a and thereby electrically connecting both metal strips 18 and 19. This contact completes the circuit for sending current through hearing aid battery A.

Figure 5:
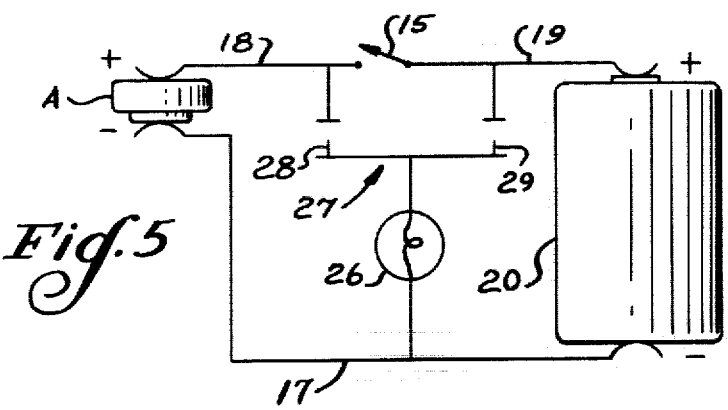
FIG. 5 is an electrical circuit of the apparatus as represented in FIG. 3.

An incandescent lamp 26 is wired to metal strip 17 (see FIG. 5) as an indicator for checking the voltage generating level present in either large battery 20 or the hearing aid battery A. It is understood that other indicators, for example a voltmeter, may be used in place of incandescent lamp 26. A three-position, push button switch mechanism, designated generally by numeral 27, permits either battery to be tested. Both FIGS. 3 and 5 illustrate switch mechanism 27 in the non-testing position. The closed circuit connection for making either test is completed by pushing either button 28 or button 29, depending upon which battery is being tested. When button 28 is depressed, the incandescent lamp is electrically connected to metal strip 18 thereby completing a circuit loop for testing the voltage level on the hearing aid battery. If the hearing aid battery is sufficiently depolarized, then the incandescent lamp will be brightly lit up. If button 29 is depressed, the incandescent lamp is electrically connected to metal strip 19 thereby completing a circuit loop with large battery 20. If the incandescent lamp is brightly lit, the large battery still has a sufficient voltage level for further use.

The device operates in the following manner to recharge hearing aid battery A. Once the hearing aid battery has been positioned so that its negative end is in intimate contact with metal strip 17 and its positive end is in intimate contact with metal strip 18, depolarization may take place. Box lid 13 is simply pivoted into the closed position thereby allowing plate 15 to act as an actuator switch to connect metal strips 18 and 19. Once the connection has been made, an electrical circuit is completed and current is free to flow through the circuit. Electric current moves from the positive end of the recharging battery 20 through metal strip 17 and into the positive end of hearing aid battery A. The current traveling through hearing aid battery A depolarizes the plates and recharges or restores the hearing aid battery to its original capacity as long as the plate and the active acid or alkali are not exhausted. After a few hours, the restored battery reaches a voltage level of approximately 1.5 volts. This level is approximately equal to that of large battery 20. When this equilibrium is reached, current will no longer flow through the electrical circuit. Thus, only that amount of power needed to revitalize the hearing aid battery is used, and no additional energy is wasted.

While in the foregoing specification a detailed description of a specific embodiment of the invention was set forth for the purpose of illustration, it will be understood that many details given herein may be varied considerably by those skilled in the art without departing from the spirit and scope of the invention.

What is claimed is:

1. A life-prolonging device for ear level hearing aids and the like comprising:
    a box-type housing having a lid hingedly mounted thereto, said lid having an actuating switch means;
    a platform equipped with restoring battery means removably mounted in said housing, said restoring battery means having a positive and a negative end, said platform being further equipped with means for mounting a hearing aid battery for depolarizing the same;
    an electrical circuit mounted on said platform having a first current flow circuit portion adapted to deliver electrical current to the negative end of said restoring battery means from the negative end of said hearing aid battery, a second current flow portion for delivering electrical current to the positive end of said hearing aid battery, a third current flow portion for receiving electrical current from the positive end of said restoring battery means, said second and third circuit portions being connectable through said actuating switch means when said box lid is in the closed position.

2. The device of claim 1 in which said platform is further equipped with means for testing the voltage level of said restoring battery means and said hearing aid battery when said box lid is in the open position, said testing means being supported by said platform.

3. The device of claim 2 wherein said means for testing the voltage level includes indicator means connected to said first circuit portion and a three-position switching means for connecting said indicator means to either said second circuit portion or said third portion or, alternatively, for maintaining said indicator means in an unconnected condition.

4. The device of claim 3 wherein said indicator means is an incandescent lamp.

5. The device of claim 3 wherein said indicator means is a voltmeter.

* * * * *